(12) United States Patent
Lee

(10) Patent No.: US 7,915,562 B2
(45) Date of Patent: Mar. 29, 2011

(54) HIGH ENERGY DENSITY BEAM WELDING SYSTEM USING MOLTEN METAL DROPLET JETTING

(75) Inventor: Kyoung Don Lee, Seoul (KR)

(73) Assignee: Institute For Advanced Engineering (KR)

(*) Notice: Subject to any disclaimer, the term of this patent is extended or adjusted under 35 U.S.C. 154(b) by 1174 days.

(21) Appl. No.: 11/596,108

(22) PCT Filed: May 12, 2005

(86) PCT No.: PCT/KR2005/001401
§ 371 (c)(1),
(2), (4) Date: Nov. 10, 2006

(87) PCT Pub. No.: WO2005/108002
PCT Pub. Date: Nov. 17, 2005

(65) Prior Publication Data
US 2008/0029501 A1    Feb. 7, 2008

(30) Foreign Application Priority Data
May 12, 2004  (KR) ............... 10-2004-0033611

(51) Int. Cl.
*B23K 15/00* (2006.01)
*B23K 26/20* (2006.01)

(52) U.S. Cl. ......... 219/121.13; 219/121.33; 219/121.63; 219/121.76; 219/121.84; 228/256; 228/261; 222/192; 222/420

(58) Field of Classification Search ............ 219/121.13, 219/121.14, 121.33, 121.63, 121.64, 121.84, 219/121.15, 121.65, 121.66, 121.76; 222/146.5, 222/192, 420; 164/46; 228/256, 261
See application file for complete search history.

(56) References Cited

U.S. PATENT DOCUMENTS

| | | | |
|---|---|---|---|
| 4,251,709 A * | 2/1981 | Schumacher | 219/121.14 |
| 4,309,589 A | 1/1982 | Hashimoto et al. | |
| 4,546,230 A | 10/1985 | Sasaki et al. | |
| 5,028,584 A * | 7/1991 | Schultheiss et al. | 505/452 |
| 5,208,431 A * | 5/1993 | Uchiyama et al. | 219/121.65 |
| 5,616,258 A | 4/1997 | Dreizin et al. | |
| 6,091,043 A * | 7/2000 | White et al. | 219/76.14 |
| 6,203,861 B1 * | 3/2001 | Kar et al. | 427/554 |
| 6,221,175 B1 * | 4/2001 | Kurz et al. | 148/242 |
| 6,429,402 B1 * | 8/2002 | Dixon et al. | 219/121.63 |
| 6,610,959 B2 | 8/2003 | Carlson et al. | |
| 6,811,073 B2 * | 11/2004 | Ohashi et al. | 228/256 |
| 7,250,081 B2 * | 7/2007 | Hu et al. | 117/1 |

FOREIGN PATENT DOCUMENTS

| | | | |
|---|---|---|---|
| JP | 53095150 A * | 8/1978 | |
| JP | 58-184083 | 10/1983 | |
| JP | 07-171690 | 7/1995 | |

* cited by examiner

*Primary Examiner* — Samuel M Heinrich
(74) *Attorney, Agent, or Firm* — BainwoodHuang

(57) ABSTRACT

The present invention relates to a high energy density beam welding system using molten metal droplet jetting. The present invention includes a beam emitting unit for emitting a high energy density beam onto a welded portion on a target object; and a molten metal droplet jetting unit for generating molten metal droplets to transfer or spray the molten metal droplets onto the welded portion on the target object, which follows a path of the beam emitting unit. Thus, it has advantages of widening a range of applications and enhancing the productivity and the quality in that a welding can be performed at a high junction efficiency even where a gap is wide, a loss in the high density energy beam is small, and heat distortions of the welded portion can be minimized.

5 Claims, 2 Drawing Sheets

[Fig. 1]
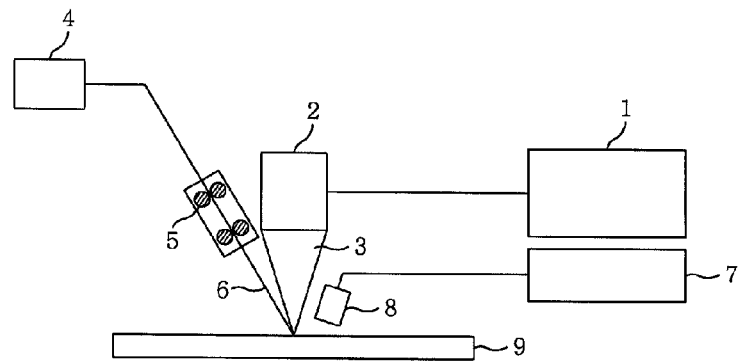
[Fig. 2]
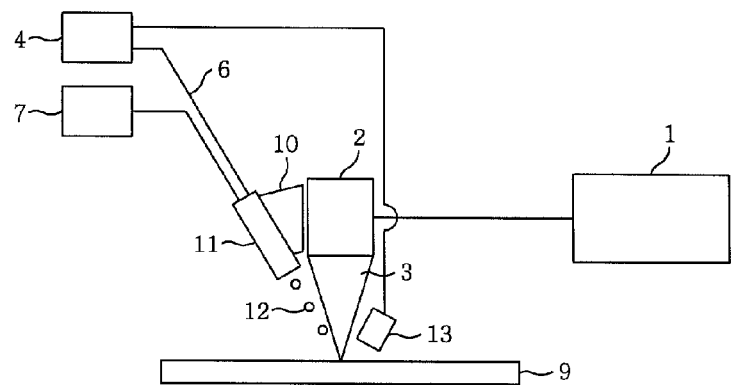
[Fig. 3]
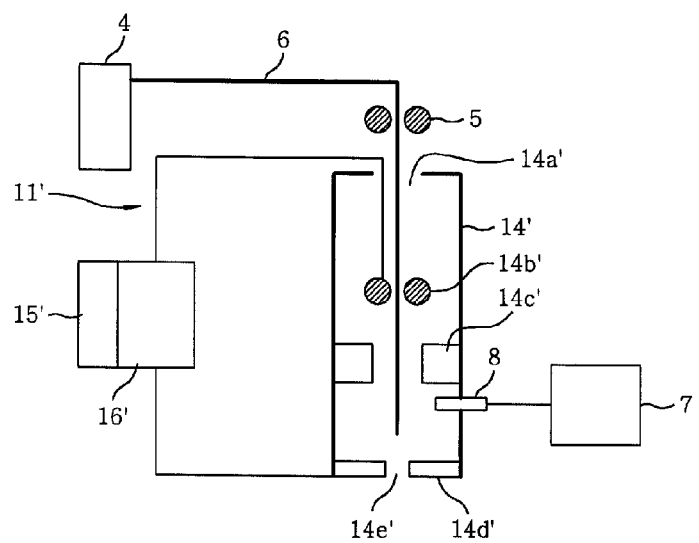

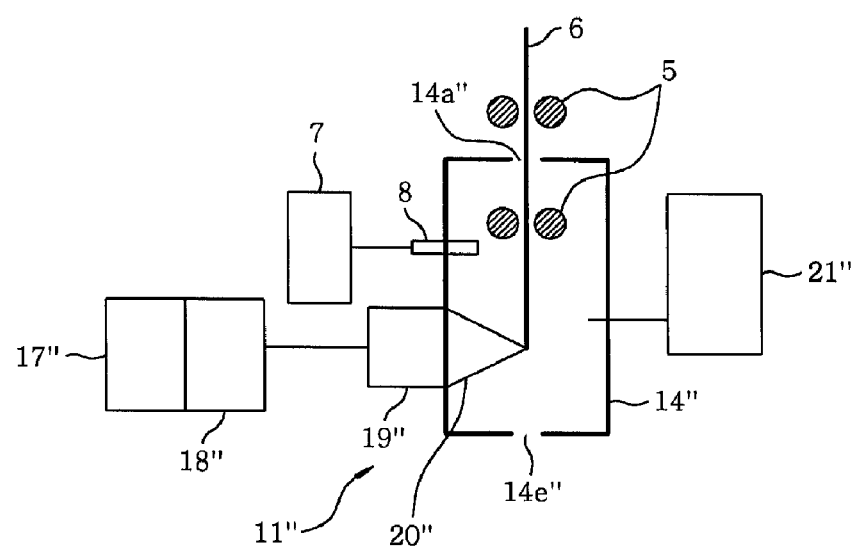
[Fig. 4]

HIGH ENERGY DENSITY BEAM WELDING SYSTEM USING MOLTEN METAL DROPLET JETTING

TECHNICAL FIELD

The present invention relates to a high energy density beam welding system using molten metal droplet jetting; and, more particularly, to a high energy density beam welding system capable of, while a high energy density beam melts a portion to be welded on a target object, transferring or spraying molten metal droplets into a gap in the portion to be welded so that a joint can be welded even when a gap therein is relatively wide, the welding efficiency can be enhanced by reducing energy loss because only the target object is heated and melted by the high energy density beam, and thermal distortions can be minimized by reducing heat input.

BACKGROUND ART

In general, welding using high energy density beams such as laser beam is widely applied especially where fine welding or neat appearances are required, because an instantaneous melting is possible through the use of high energy beam so that the welding can be performed very quickly and the penetration is deepened and thermal distortions of the target object are reduced by means of a very narrow beam so that a high welding quality can be achieved.

Gap constraint required for a conventional butt welding using high energy density beam is as follows:

$$g \leq \min(0.1t, 0.15d \sim 0.3d)$$

where t (mm) is the thickness of a plate as the target object, g (mm) is the gap in a joint on the target object, d (mm) is the focus diameter of the high energy density beam, b (mm) is the width of a weld, and h (mm) is the height of a weld, and, in case the plate is made of steel or aluminum having a thickness of 1~3 mm, the good weld width is in the range of:

$$b = 1 \sim 4 \text{ mm}.$$

Therefore, the conventional butt welding using high energy density beam can be applied to very limited cases, and a welding wire is employed for performing the high energy density beam welding in a wide range of cases where the gap g does not meet the above constraints.

FIG. 1 shows a schematic diagram depicting a conventional high energy density beam welding system using a welding wire.

A weld is formed by melting simultaneously a front end of a welding wire 6 and a portion to be welded on a target object 9 by means of a high energy density beam 3 emitted from a beam generator 1 through a focus regulator 2. Therefore, it is required that the focus of the high energy density beam 3 be located at the front end of the welding wire 6 provided by a wire supplier 4 and the portion to be welded on the target object 9 with a discrepancy of 1 mm or less.

Meanwhile, shielding gas purges onto the portion to be welded on the target object 9 from a shielding gas nozzle 8 connected to a shielding gas supplier 7 to prevent the portion to be welded from oxidation and impurities.

Reference numeral 5 designates a wire guide for guiding the welding wire 6 provided by the wire supplier 4 such that it can be accurately delivered to the portion to be welded.

Because an error in the feeding position must be minimized, the welding wire supplier needs to be more complicated by reducing the vibration of the front end of the welding wire 6 and maintaining a contacted position to be touched. In addition, since the high energy density beam 3 melts not only the target object 9 but also the welding wire 6, an energy loss in the high energy density beam is so high to significantly lower the process speed and the efficiency of the welding.

To solve the latter problem, there have been developed such methods as to preheat the welding wire 6 and put it into a melting pool. However, these methods require an additional device which needs to be integrated to the welding wire supplier, which is not efficient and constrained in the operations.

Besides, since the high energy density beam 3 melts not only the target object 9 but also the welding wire 6, a heat input in the portion to be welded is so great that the portion to be welded is subject to significant thermal distortion, finally deteriorating the overall welding quality.

In case the gap g is too wide to be within the constraints for high energy density beam welding, it is possible to perform an arc and high energy density beam hybrid welding.

However, this method has drawbacks in that a heat input in the portion to be welded is within the same order but the width of the molten portion is almost as twice as the case of the high energy density beam welding, and in addition, the thermal distortion is more severe compared thereto.

Moreover, arc and charring occurs between the welding wire and the target object and a stable condition is dependent on the characteristics of the material and the environment, such as the distance, angle and direction between the arc welder and the target metal.

In conclusion, although the hybrid welding may be applied to the case where the gap is wide, it is not suitable for providing a high welding quality, for example, in the case where a neat appearance is required.

DISCLOSURE OF INVENTION

Technical Problem

The present invention has been developed to solve the above problems; it is the object of the present invention to provide a high energy density beam welding system capable of welding a joint even where a gap is relatively wide, by melting a portion to be welded on the target object by means of the high energy density beam while molten metal droplets are transferred or sprayed by a molten metal droplet jetting device and, in addition, minimizing the loss of high energy density beam and the additional heat input in the welded zone.

Technical Solution

In order to solve the aforementioned problems, in accordance with the present invention, there is provided a high energy density beam welding system using molten metal droplet jetting, which comprises a beam emitting unit for emitting a high energy density beam onto a welded portion on a target object; and a molten metal droplet jetting unit for generating molten metal droplets to transfer or spray the molten metal droplets onto the welded portion on the target object following a path of the beam emitting unit.

The object and various advantages of the present invention will become more apparent to those skilled in the art from the preferred embodiment described below with reference to the accompanying drawings.

ADVANTAGEOUS EFFECTS

In accordance with the present invention, a welding can be performed even where a gap is wide with a high welding efficiency thereby making it suitable for a wide range of applications and it is not required to provide, e.g., an additional device for reducing vibrations and positional errors of the front end of the welding wire when the welding wire is fed into the gap in the joint on the target object thereby enhancing the operation efficiency of the welding system and melting the target object and the welding wire simultaneously is not needed so that the loss in the high energy density beam is small, and the heat input in the portion to be welded is accordingly small to minimize the thermal distortions in the portion to be welded so that a high welding quality with an accuracy and a neatness can be achieved.

BRIEF DESCRIPTION OF THE DRAWINGS

FIG. 1 is a schematic diagram depicting a conventional high energy density beam welding system using a welding wire;

FIG. 2 is a schematic diagram representing a high energy density beam welding system using molten metal droplets in accordance with the present invention;

FIG. 3 is schematic diagram showing an embodiment of an arc gun type molten metal droplet jetting device in accordance with the present invention; and FIG. 4 is a schematic diagram showing an embodiment of a gas nozzle gun type molten metal droplet jetting device in accordance with the present invention.

BEST MODE FOR CARRYING OUT THE INVENTION

Hereinafter, a preferred embodiment of the present invention will be described in detail with reference to the accompanying drawings.

FIG. 2 is a schematic diagram representing a high energy density beam welding system using molten metal droplet jetting in accordance with the present invention.

The high energy density beam welding system in accordance with the present invention includes a beam emitting unit and a molten metal droplet jetting unit. The beam emitting unit emits a high energy density beam onto a portion to be welded on a target object 9 to melt it. The molten metal droplet jetting unit sprays molten metal droplets 12 onto a gap formed in between the portion to be welded on the target object 9.

As the high energy density beam 3 can be employed a continuous or pulsed Nd:YAG laser beam, $CO_2$ laser beam, fiber laser beam, plasma or electron beam. The moment when the high energy density beam 3 is emitted may or may not be synchronous with the moment when the molten metal droplets 12 are sprayed.

The beam emitting unit emits the high energy density beam 3 generated by a beam generator 1 onto the portion to be welded on the target object 9 through a focus regulator.

The molten metal droplet jetting unit, following the moving path of the beam emitting unit, includes a wire supplier for providing a welding wire 6, a wire guide 5, a molten metal droplet jetting device 11 for generating the molten metal droplets 12 by melting a front end of the provided welding wire 6 to spray the generated molten metal droplets 12 onto the portion to be welded on the target object 9, a direction regulator for regulating, e.g., the sprayed direction of the molten metal droplets by changing the position and the direction of the molten metal droplet jetting device 11, a shielding gas supplier 7 for supplying shielding gas into the molten metal droplet jetting device 11 to prevent oxidation of the molten metal droplets 12, a shielding gas spray nozzle 8 and a monitoring device 13 for monitoring the portion to be welded on the target object 9 to send state information on a gap width and so forth to the molten metal droplet jetting device 11, thereby making it possible to regulate such factors as an generating amount and individual size of the molten metal droplets 12 and the like.

Here, the welding wire 6 is made of the same material as the target object 9 or a different kind of metal, depending on which material the target object 9 is made of.

Furthermore, although it is preferable that a welding wire 6 is used as a type of the parent metal of molten metal droplets, it is also possible to use a rod or powder instead of a wire.

FIG. 3 illustrates a schematic diagram showing an embodiment of an arc gun type molten metal droplet jetting device in accordance with the present invention.

An arc gun type molten metal droplet jetting device 11' includes an arc gun 14', a power supply unit 15', for supplying powers to the first electrode 14b' and the second electrode 14d' in the arc gun 14' and a control unit 16' for controlling process conditions for a proper amount of the molten metal droplets 12 according to information of the portion to be welded sent from the monitoring device 13.

The arc gun 14' includes a wire entrance 14a', the first electrode 14b' contacting the provided welding wire 6 for supplying a power thereto, the second electrode 14d' which polarity is opposite to that of the first electrode 14b' and generates an arc in a space between the front end of the welding wire 6 to melt the front end of the welding wire 6 thereby transferring or spraying the molten metal droplets 12 to the portion to be welded through the opening 14e', an insulation block 14c' placed between the two electrodes 14b' and 14d' for insulating between them and a discharge opening 14e'.

Thus, the arc gun type molten metal droplet jetting device 11' melts the front end of the welding wire 6 by means of the arc generated in the space between the welding wire 6 and the second electrode 14d' having a polarity opposite to that of the welding wire 6, and then sprays the generated molten metal droplets 12 onto the portion to be welded on the target object 9.

Furthermore, when the second electrode 14d' is used up as the operation continues and the material of the second electrode 14d' needs to be replaced or changed for different target materials, it is preferable to design the arc gun 14' such that the second electrode can be separated and replaced from an upper portion including the insulation block 14c' and above. In this case, a distance between the welding wire 6 and the second electrode 14d' and the thickness of the second electrode can be easily regulated.

FIG. 4 presents a schematic diagram showing an embodiment of a gas nozzle gun type molten metal droplet jetting device in accordance with the present invention.

A gas nozzle gun type molten metal droplet jetting device 11" includes a gas nozzle gun 14", a small-size beam generating unit 17", a small-size beam control unit 18" and a small-size beam focus regulating unit 19" which serve as a small-size beam emitting unit for emitting a small-size high energy density beam 20" to melt the front end of the welding wire 6 introduced into the gas nozzle gun 14", and a pressure gas supply unit 21" to introduce a pressure gas into the gas nozzle gun 14", wherein the pressure gas separates the molten metal droplets 12 generated at the front end of the welding wire 6 by emitted thereon the small-size high energy density beam 20" and generates a spraying force thereof.

The gas nozzle gun 14" includes a wire entrance 14a" through which the welding wire 6 is introduced and a discharge opening 14*e*" through which the molten metal droplets 12 generated by melting the front end of the welding wire 6 are discharged.

Thus, the gas nozzle gun type molten metal droplet jetting device 11" melts the front end of the welding wire 6 by means of the small-size high energy density beam 20" to generate the molten metal droplets 12, supplies a pressure gas to separate the generated molten metal droplets from the welding wire 6, and sprays the molten metal droplets onto the portion to be welded on the target object 9.

The high energy density beam welding system using molten metal droplet jetting in accordance with the present invention, as described above, transfers or sprays the molten metal droplets 12 onto the gap in the portion to be welded on the target object 9 thereby making it possible to form a welding even where the gap is relatively wide with a high efficiency.

In addition, since the high energy density beam 3 melts only the welded portion on the target object 9, the loss of the high energy density beam 3 is small to enhance the welding speed and efficiency of welding and the heat input in the welded zone is small to minimize the thermal distortions therein.

Furthermore, the high energy density beam welding system using molten metal droplet jetting in accordance with the present invention can be applied not only to welding but also to such joining processes as brazing and cladding.

While the invention has been described with respect to a preferred embodiments, it will be understood by those skilled in the art that various changes and modifications may be made without departing from the spirit and scope of the invention.

The invention claimed is:

1. A high energy density beam welding system using molten metal droplet jetting, which comprises: a beam emitting unit for emitting a high energy density beam onto a welded portion on a target object; and a molten metal droplet jetting unit for generating molten metal droplets to transfer or spray the molten metal droplets onto the welded portion on the target object following a path of the beam emitting unit, wherein the molten metal droplet jetting unit includes a parent metal melting device for providing energy to a parent metal to be melted into the molten metal droplets, the parent metal being included in the parent metal melting device, and
  wherein the parent metal melting device has a beam emitting device for emitting an energy beam onto a front end of the parent metal to melt the front end of the parent metal.

2. The high energy density beam welding system of claim 1, wherein the parent metal melting device includes a pressure gas supply unit for supplying a pressure gas, wherein the pressure gas separates the molten metal droplets being generated at the front end of the parent metal by the energy beam emitted thereon from the parent metal and generates a spraying force of the molten metal droplets.

3. The high energy beam welding system of claim 1 wherein, when the parent metal is included in the parent metal melting device, the parent metal is received from a parent metal source and converted into the molten metal droplets by the beam emitting device for emitting the energy beam, the beam emitting device being separate from the beam emitting unit.

4. A high energy density beam welding system using molten metal droplet jetting, which comprises: a beam emitting unit for emitting a high energy density beam onto a welded portion on a target object; and a molten metal droplet jetting unit for generating molten metal droplets to transfer or spray the molten metal droplets onto the welded portion on the target object following a path of the beam emitting unit, wherein the molten metal droplet jetting unit includes a parent metal melting device for providing energy to a parent metal to be melted into the molten metal droplets, wherein the parent metal melting device has: a first electrode contacting the parent metal for supplying a power to the parent metal; and a second electrode placed separate from a front end of the parent metal for a polarity of the second electrode to be opposite to a polarity of the parent metal, wherein the polarity of the parent metal depends on a polarity of the first electrode, the second electrode generating an arc in a space between the front end of the parent metal and the second electrode to melt the front end of the parent metal, thereby generating the molten metal droplets to be transferred or sprayed, and
  wherein the second electrode is configured to be detachable from the first electrode in order to replace the second electrode.

5. The high energy density beam welding system of claim 4, wherein the parent metal melting device further includes an upper portion which includes an insulation block located between the first electrode and the second electrode; and
  wherein second electrode is further configured to be separable from the upper portion.

* * * * *